(12) United States Patent
Medlock et al.

(10) Patent No.: US 7,616,680 B2
(45) Date of Patent: *Nov. 10, 2009

(54) METHOD FOR PROCESSING DATA IN A SPREAD SPECTRUM SYSTEM

(75) Inventors: Joel D. Medlock, Campbell, CA (US); Keith Rieken, Cupertino, CA (US); David M. Holmes, Cupertino, CA (US)

(73) Assignee: Infineon Technologies AG, Neubiberg (DE)

( * ) Notice: Subject to any disclaimer, the term of this patent is extended or adjusted under 35 U.S.C. 154(b) by 414 days.

This patent is subject to a terminal disclaimer.

(21) Appl. No.: 11/447,228

(22) Filed: Jun. 5, 2006

(65) Prior Publication Data

US 2006/0291542 A1    Dec. 28, 2006

(51) Int. Cl.
*H04B 1/69* (2006.01)
(52) U.S. Cl. ...................... 375/147; 375/316
(58) Field of Classification Search ............... 375/147, 375/130, 150, 377, 316; 370/342, 310; 369/60.01, 369/69, 272.1; 711/1, 100, 101, 220, 104, 711/170, 173
See application file for complete search history.

(56) References Cited

U.S. PATENT DOCUMENTS

| | | | |
|---|---|---|---|
| 5,555,193 A | 9/1996 | Tsinberg et al. | |
| 5,719,944 A | 2/1998 | Banerjea | |
| 5,764,687 A | 6/1998 | Easton | |
| 5,778,024 A | 7/1998 | McDonough | |
| 5,818,523 A | 10/1998 | Ban et al. | |
| 5,881,056 A | 3/1999 | Huang et al. | |
| 5,889,815 A | 3/1999 | Iwakiri et al. | |
| 5,903,232 A | 5/1999 | Zarubinsky et al. | |
| 5,929,832 A | 7/1999 | Furukawa et al. | |
| 6,233,277 B1 | 5/2001 | Ozcelik et al. | |
| 6,363,470 B1 | 3/2002 | Laurenti et al. | |
| 6,639,906 B1 | 10/2003 | Levin | |
| 6,650,694 B1 | 11/2003 | Brown et al. | |
| 6,697,603 B1 | 2/2004 | Lovinggood et al. | |
| 7,054,351 B1 | 5/2006 | Braam et al. | |

FOREIGN PATENT DOCUMENTS

EP    0 998 052    5/2000

OTHER PUBLICATIONS

J.S. Lee, L.E. Miller; "CDMA Systems Engineering Handbook"; Artech House 1998, pp. 972-982.
A.V. Oppenheim et al.; "Signals & Systems"; Prentice Hall, 2d edition 1997, pp. 549-555.

*Primary Examiner*—Temesghen Ghebretinsae
(74) *Attorney, Agent, or Firm*—Dickstein Shapiro LLP

(57) ABSTRACT

A method for processing data in a spread spectrum system, including decimating a data rate of received spread spectrum data by a decimation factor to a decimated rate; storing the received spread spectrum data into a memory at the decimated rate; interpolating the decimated rate by an interpolation factor to an interpolated rate; and reading the received spread spectrum data from the memory at the interpolated rate.

14 Claims, 13 Drawing Sheets

METHOD FOR PROCESSING DATA IN A SPREAD SPECTRUM SYSTEM

PRIORITY DATA

This application claims priority from the following Provisional Applications:

(1) "Method and Apparatus for Decimation-Interpolation Applied to CDMA Systems," bearing U.S. Ser. No. 60/222,027, filed on Jul. 31, 2000;

(2) "Apparatus and Method for Concurrent Sample Selection and Reuse of Rake Fingers," bearing U.S. Ser. No. 60/222,008, filed on Jul. 31, 2000;

(3) "Concurrent Sample Selection, Segmented-Cache for CDMA Rake Fingers," bearing U.S. Ser. No. 60/222,025, filed on Jul. 31, 2000; and (4) "Apparatus and Method for Concurrent Sample Selection in a CDMA System," bearing U.S. Ser. No. 60/222,029, filed on Jul. 31, 2000.

CROSS REFERENCE TO RELATED APPLICATIONS

Related applications are:

"Flexible CDMA System Architecture", Ser. No. 60/222,828, filed Aug. 3, 2000, now abandoned;

"Generic Data Path Processor for W-CDMA Applications, filed Jul. 31, 2000, now abandoned;

"Generic Finger Architecture for W-CDMA Applications, Ser. No. 09/920,094, filed Jul. 31, 2000, now U.S. Pat. No. 6,459,883.

Each of these applications is incorporated herein by reference.

BACKGROUND OF THE INVENTION

This invention relates generally to wireless communication systems.

Wireless communication has many applications in consumer and business markets. Among the many applications are: mobile wireless, fixed wireless, unlicensed Federal Communications Commission (FCC) wireless, local area network (LAN), cordless telephony, personal base station, telemetry, and others. Generally, each of these applications utilizes unique and frequently incompatible modulation techniques and protocols.

Wireless communication devices, such as cellular handsets, typically need to acquire certain cell specific information and characteristics before negotiating a service with a base station. For this purpose, each base station transmits certain cell specific information necessary for a user to acquire services such as paging or cellular telephony from the base station. For example, in CDMA systems, the cell specific information is contained in pilot and/or synchronization channels. The pilot and/or synchronization channels are spread and scrambled with cell specific pseudo-random noise or gold code sequences, which form the basis for frame, slot, and bit timing synchronization for a handset.

Multiple users are typically in communication with a single base station. Although such users operate on the same frequency at the same time, various techniques allow multiple users to be distinguished from one another. In CDMA systems, each handset user is assigned a different orthogonal code that is used to spread the data transmitted from the base station so as to distinguish it from the data transmitted to other handset users.

FIG. 1 illustrates a prior art communication device 100. The communication device 100 includes an antenna 102, a front-end processor 104, a base band processor 106, a microprocessor/controller 108, and a bus for interconnecting the front-end processor 104, the base based processor, and a microprocessor/controller 108. The microprocessor 108 supports the exchange of data and/or instructions to the other components of the communication device 100. The base band processor 106 is coupled to the front-end processor 104 to receive and transmit data. The communication device 100 may be a mobile handset, a test platform, an embedded modem, a base station or other communication devices in other code-dependent applications.

The front-end processor 104 is coupled to the antenna 102 to receive data. The front-end processor 104 includes components and performs functions that are known to those skilled in the art. These components are not shown in the front-end processor 104 for purposes of clarity.

After data has been processed by the front-end processor, the processed data is supplied to the-base band processor 106. In spread spectrum systems, the base band processor has to be able to identify, despread, and decode the data. Despreading (i.e., multiplication of the process data by the same binary spreading waveform as was used to spread the data at the transmitter) and removal of the carrier modulation restore the original baseband data waveform.

In practice, multiple copies of the same signal are typically received at communications device 100 within a short time of each other. These copies, which are sometimes called multipath components arise because the signals take different paths of different length from the transmitter antenna to the receiver antenna. In the case of a CDMA system, it is feasible and advantageous to despread and decode several of the multipath components, realign them so that they are also in phase and combine them to produce a stronger signal. To do this, the base band processor in a CDMA system typically takes the form of a rake receiver that has several fingers, each one of which is a receiver that despreads and decodes one of the multipath components. General information about rake receivers can be found at pages 972-982 of J. S. Lee, L. E. Miller, *CDMA Systems Engineering Handbook* (Artech House 1998).

Generally, received data is sampled at a rate known as the chipping rate. In the IS-95 and 3 GPP CDMA standards, the chipping rates are 1.2288 MHz and 3.84 MHz, respectively, which correspond to sampling periods of 0.814 microseconds and 0.2604 microseconds. The sampling period is known as a chip.

Data is usually processed in pairs, commonly referred to as "In-Phase" (I) and "Quadrature" (Q) data. A rake finger is supplied with three samples, typically labeled Early, On-Time, and Late, where each sample includes a pair of data (i.e., I and Q data). The On-Time sample contains the data to be decoded. The Early and Late samples are used in tracking tools to ensure that the On-Time sample represents the center of the chip.

Two examples of chipping rate are 1.2288 MHz and 3.84 MHz which correspond to sampling periods of 0.814 microseconds and 0.2604 microseconds. These are used in IS95 and 3GPP CDMA systems, respectively.

Further, data is typically despread by multiple rake fingers. A need arises for apparatus and methods that allow reuse of multiple rake fingers to conserve physical silicon space and allow the multiple rake fingers to access the data storage substantially concurrently to achieve faster processing.

SUMMARY

In an exemplary embodiment of the present invention, the sampling rate of received data is decimated by a factor of D and the received data is stored in memory at the decimated rate. By storing received data at the decimated rate, storage requirements are reduced by a factor of D. This can be done because the data, prior to sampling, has been filtered such that all information at sampling rates greater than twice the filter cut-off frequency has been removed. The stored data is subsequently interpolated by a factor of IR to restore it to a faster rate, a multiple of the chipping rate. In an exemplary embodiment, decimation and interpolation operations occur at the beginning of the signal processing chain, thus providing the benefit of reduced storage requirements at the front end of the processing chain. However, decimation and interpolation operations can occur anywhere in the signal processing chain and therefore are not limited to implementations at the front end.

In an exemplary embodiment, the memory is a circular buffer comprising a set of registers. Each register is divided into two parts for storing in-phase and quadrature (I and Q) data, respectively. Once data has been stored into memory (at a decimated rate), a despreading circuit (e.g., a rake receiver), which includes multiple rake fingers, can access the data. The multiple rake fingers can substantially simultaneously access data in the memory via a selector circuit for each rake finger. Each selector circuit includes multiple multiplexers controlled by a set of select lines. The select lines are controlled by an external controller.

In another exemplary embodiment, the memory is a single port RAM that is divided into blocks based on the applicable chipping rate and the round-trip distance between serviceable mobile terminals and a base station. If the memory is divided into three blocks, for example, during each pass by a virtual or physical rake finger, two blocks in the memory are in a Read mode while the third block is in a Write mode These blocks are further divided into segments based on a performance area trade-off. In this context, each block of RAM is in effect a stand-alone single port RAM.

In another exemplary embodiment, the memory can contain enough storage locations to store data from multiple antennas and store enough data from each antenna to allow the alignment of the signals received from the multipaths.

Each block of data may contain data from a plurality of CDMA encoded channels each with possible multipaths. By reprocessing the data multiple times the memory and the rake fingers are effectively used many times per chip (or block of chips) thus significantly reducing the amount of hardware required for a given number of (logical) fingers, and combiners.

To avoid having to use a multiport read/write RAM, a time-sharing method may be used. One (or more) cycle can be dedicated to write operations and many cycles can be dedicated to read operations.

DETAILED DESCRIPTION

Reference will now be made in detail to the various embodiments of the invention. In the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

Figure 1:
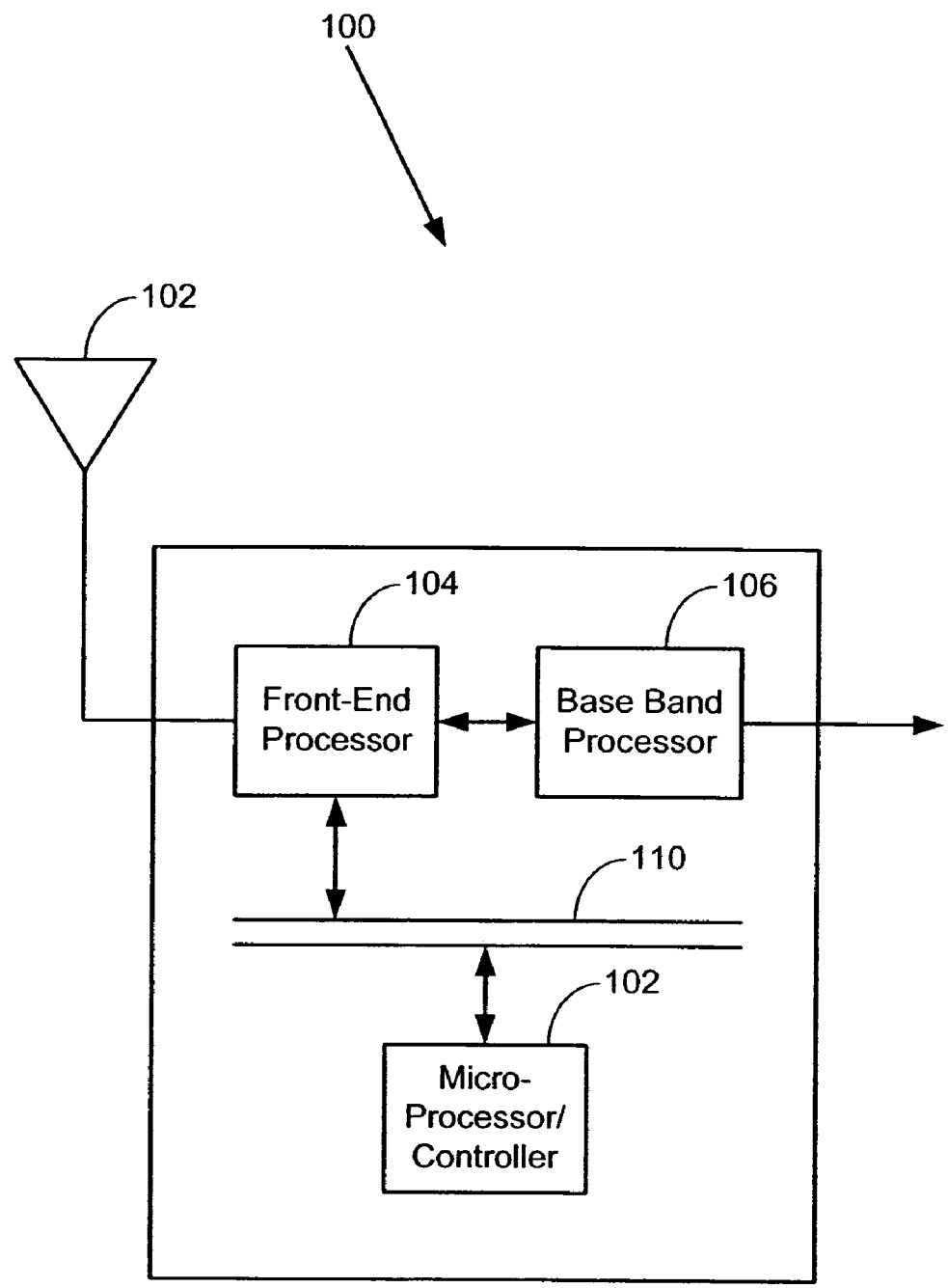
FIG. 1 illustrates a prior art communication device.
Figure 2:
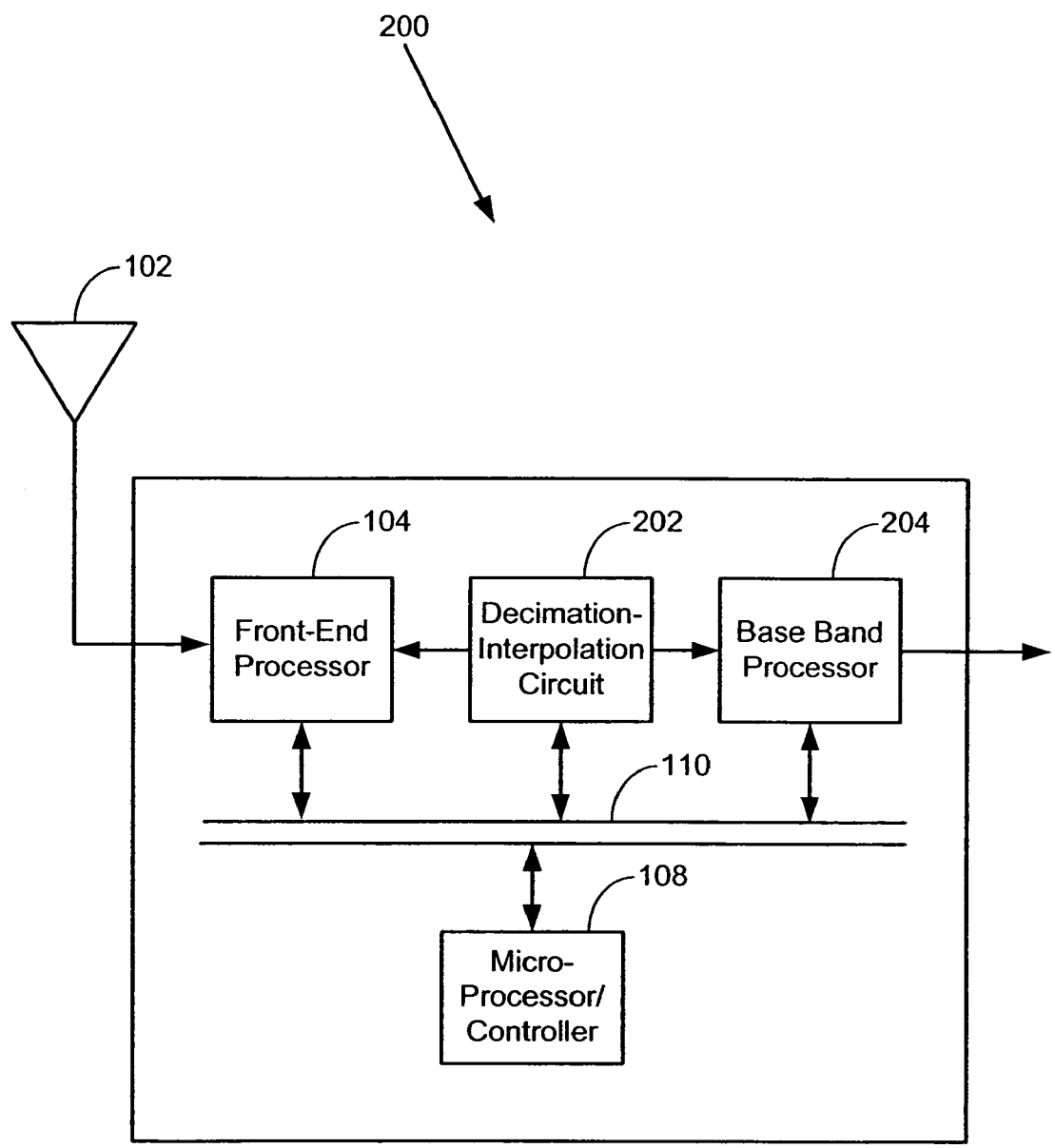
FIG. 2 illustrates an exemplary communication device in accordance with an embodiment of the invention.

FIG. 2 illustrates an exemplary communication device 200 in accordance with an embodiment of the invention. The communication device 200 includes an antenna 102, a front-end processor 104, a decimation-interpolation circuit 202, a base band processor 204, a microprocessor 108, and a bus 110 for interconnecting the above components. The decimation-interpolation circuit 202 receives data from the front-end processor 104, stores the data (the amount of data stored will depend on details of the embodiment chosen), and converts the sampling rate into a rate more advantageous for processing by the other processing units, such as the baseband processor 204. The baseband processor 204 includes mechanisms that allow multiple despreaders (e.g., rake fingers) to substantially simultaneously retrieve data from a memory in the decimation-interpolation circuit 202. Exemplary embodiments of such mechanisms are described in FIGS. 8 and 10 below.

Figure 3:
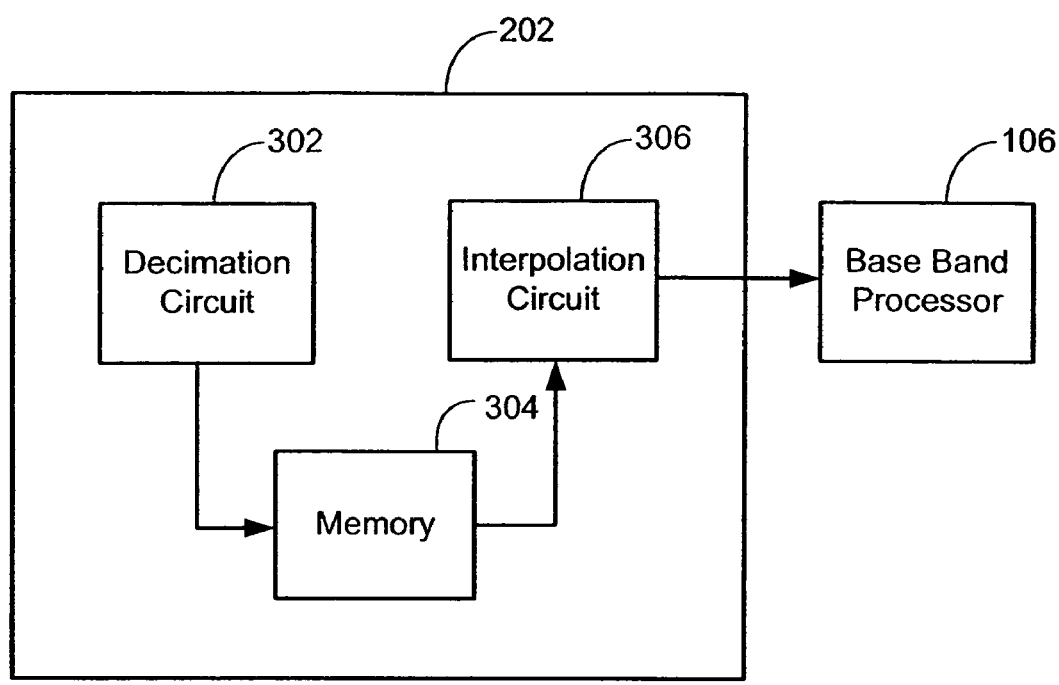
FIG. 3 illustrates an exemplary decimation-interpolation circuit in accordance with an embodiment of the invention.

FIG. 3 illustrates an exemplary decimation-interpolation circuit 202 in accordance with an embodiment of the invention. The decimation-interpolation circuit 202 includes a decimation circuit 302, a memory 304, and an interpolation circuit 306. In an exemplary embodiment, the memory 304 is a single-port RAM. In another exemplary embodiment, the memory 304 is a FIFO RAM, a set of registers, or other suitable memory devices. Exemplary embodiments of the memory 304 are described in FIGS. 7, 9, 12 and 13, below.

Data received from the front-end processor 104 is decimated by the decimation circuit 302 by a factor of D to reduce the sampling rate (R) to a minimum sampling rate (e.g., R/D) more efficient for storage in the memory 304.

Data retrieved from the memory 304 is interpolated by the interpolation circuit 306 by a factor of IR to increase its speed to a rate of R*IR/D before being outputted into the base band processor 204. In an exemplary embodiment, the decimation factor (D) and the interpolation factor (IR) are independently determined depending on the surrounding infrastructure. For example, the decimation factor may be configured to decimate the sampling rate by a factor of four while the interpolation factor may be configured to increase the sampling rate by a factor of two. When the decimation factor and the interpolation factor are the same, the decimation and the interpolation factors cancel each other exactly and the final output data rate is the same as the received data rate (i.e., sampling rate).

In one embodiment, the decimation factor and the interpolation factor are hard-coded into the decimation-interpolation circuit 202. In another embodiment, the decimation factor and the interpolation factor are dynamically configurable to adapt to multiple communication protocols by making the filter coefficients programmable.

Figure 4:
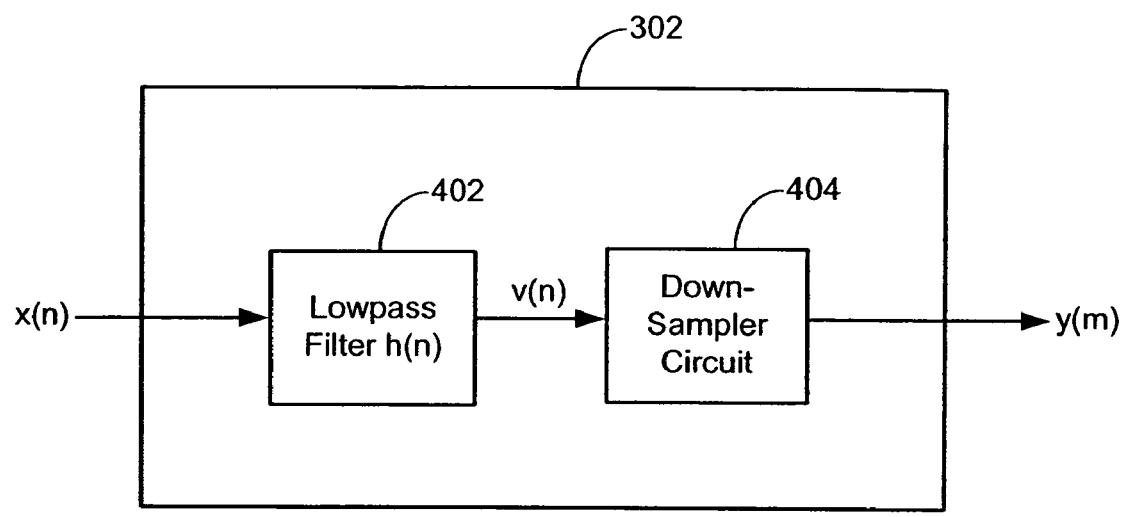
FIG. 4 illustrates an exemplary decimation circuit in accordance with an embodiment of the invention.

FIG. 4 illustrates an exemplary decimation circuit 302 in accordance with an embodiment of the invention. The decimation circuit 302 includes a low pass filter 402 and a downsampler circuit 404. The low pass filter 402 and the downsampler circuit 404 are designed using well known principles for designing decimation circuits. For example, assume a signal x(n) with a spectrum $X(\omega)$ is to be downsampled by an integer factor D. The input sequence x(n) is first passed through the lowpass filter 402 that is characterized by the impulse response h(n) and a frequency response $H_D(\omega)$. In an exemplary embodiment, $H_D(\omega))$ is equal to 1 when $|\omega| \leq \pi/D$ and is equal to 0 otherwise. The lowpass filter 402 eliminates the spectrum of $X(\omega)$ in the range of $\pi/D < \omega < \pi$. The output of the lowpass filter 402 is a sequence v(n):

$$v(n) = \sum_{k=0}^{\infty} h(k)x(n-k)$$

The sequence v(n) is down sampled in the down-sampler circuit 404 by a factor D to produce y(m):

$$y(m) = v(\text{mD}) = \sum_{k=0}^{\infty} h(k)x(\text{mD}-k)$$

A person skilled in the art will know specific gate structures necessary to construct a decimation circuit to serve the purposes of the decimation circuit 302 based on the above described principles.

Figure 5:
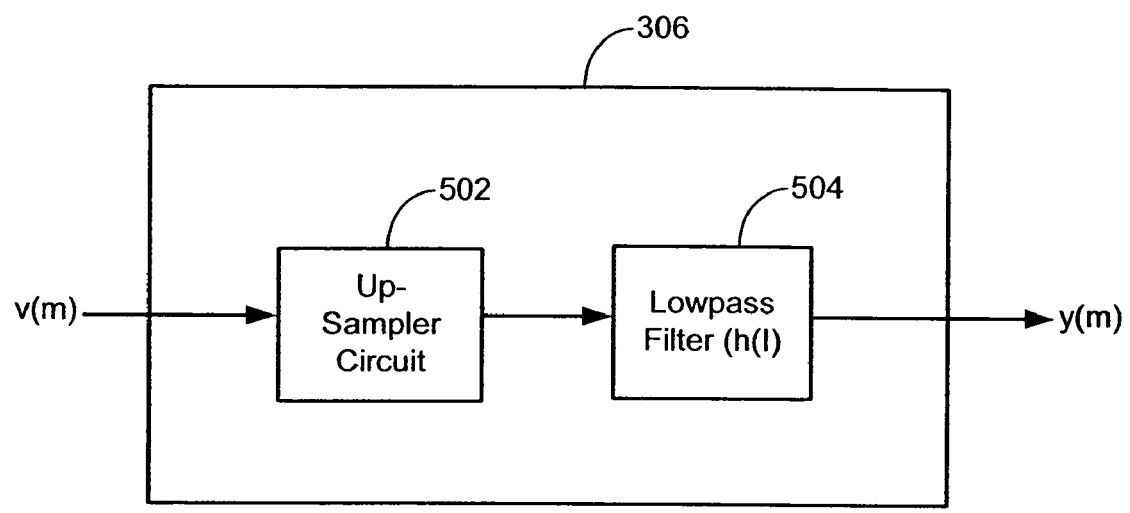
FIG. 5 illustrates an exemplary interpolation circuit in accordance with an embodiment of the invention.

An increase in the sampling rate by an integer factor of IR can be accomplished by interpolating IR-1 new samples between successive values of the signal. As generally known in the art, the interpolation process can be accomplished in a variety of ways. In an exemplary embodiment, a process that preserves the spectral shape of the signal sequence x(n) is used. FIG. 5 illustrates an exemplary interpolation circuit 306 in accordance with an embodiment of the invention. The interpolation circuit 306 includes an up-sampler circuit 502 coupled to a lowpass filter 504.

In an exemplary embodiment, v(m) denotes a sequence that is obtained from x(n) by adding IR-1 zeros between successive values of x(n). In an exemplary embodiment, the sampling rate of v(m) is equal to the rate of y(m) above. Further, v(m) is equal to x(m/IR), when m=0, ±IR, ±2IR, ... and equal to zero otherwise. A z-transform is performed on v(m) in the up-sampler circuit 502. Subsequent to the z-transform, the sampling rate increase obtained by the addition of IR-I zero samples between successive values of x(n) results in a signal whose spectrum $V(\omega_y)$ is an IR-fold periodic repetition of the input signal spectrum $X(\omega_x)$. Because only the frequency components of x(n) in the range $0 \leq \omega_y \leq \pi/IR$ are unique, the images of $X(\omega)$ above $\omega_y = \pi/IR$ are rejected by passing the sequence v(m) through the lowpass filter 504 that has a frequency response of $H_f(\omega_y)$. In an exemplary embodiment, $H_f(\omega_y)$ is equal to C when $0 \leq |\omega| \leq \pi/IR$ and equal to 0 otherwise. C is a scale factor that is required to properly normalize the output sequence y(m). In an exemplary embodiment, C is selected so that the output y(m) is equal to x(m/IR) for m=0, ±IR, ±2IR, etc. In an exemplary embodiment, the output sequence y(m) may be expressed as a convolution of the sequence v(n) (see FIG. 4) with the unit sample response h(n) of the lowpass filter 504.

A person skilled in the art will know specific gate structures necessary to construct an interpolation circuit to serve the purposes of the interpolation circuit 306 based on the above described principles. Additional information regarding decimation and interpolation can be found at pages 549-555 of A. V. Oppenheim et al., *Signals & Systems* (Prentice Hall, 2d edition 1997). This reference is hereby incorporated for all purposes.

Figure 6:
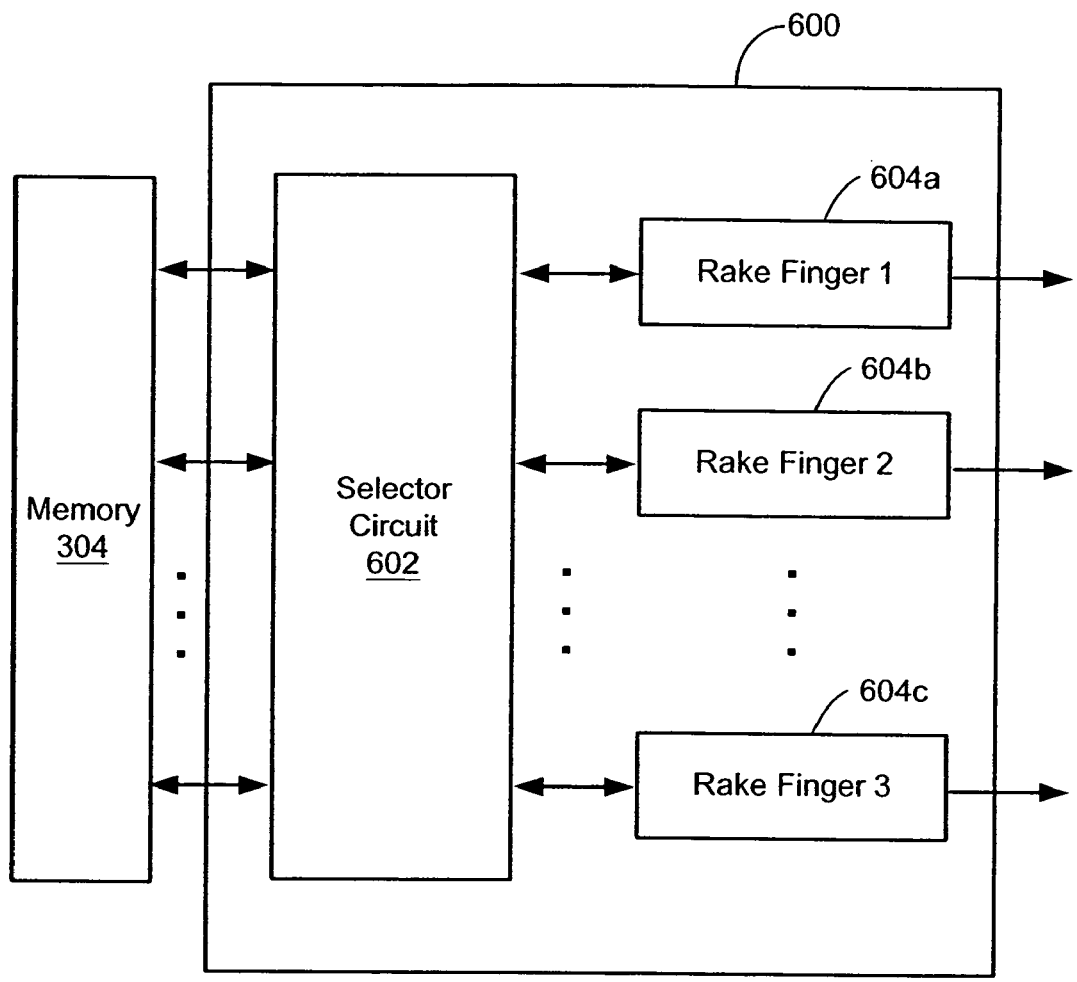
FIG. 6 illustrates an exemplary despreading circuit in a base band processor in accordance with an embodiment of the invention.

FIG. 6 illustrates an exemplary despreading circuit 600 in the base band processor 204 of the invention. The despreading circuit 600 includes a selector circuit 602 coupled to multiple rake fingers 604a-604c. The number of rake fingers shown is for illustration purposes only. In a despreading circuit, the number of rake fingers may be more or less depending on system design requirements. The selector circuit 602 selectively couples the multiple rake fingers 604 at substantially the same time to the memory 304 to allow the rake fingers 604 to retrieve data stored in the memory 304. In an exemplary embodiment, rather than using a different rake finger 604 to process the data of each different multipath, circuits in the individual rake fingers 604 can be reused. Each reuse of the hardware of a finger to process a different multipath or a path of a different data channel is referred to as using a virtual finger.

Figure 7:
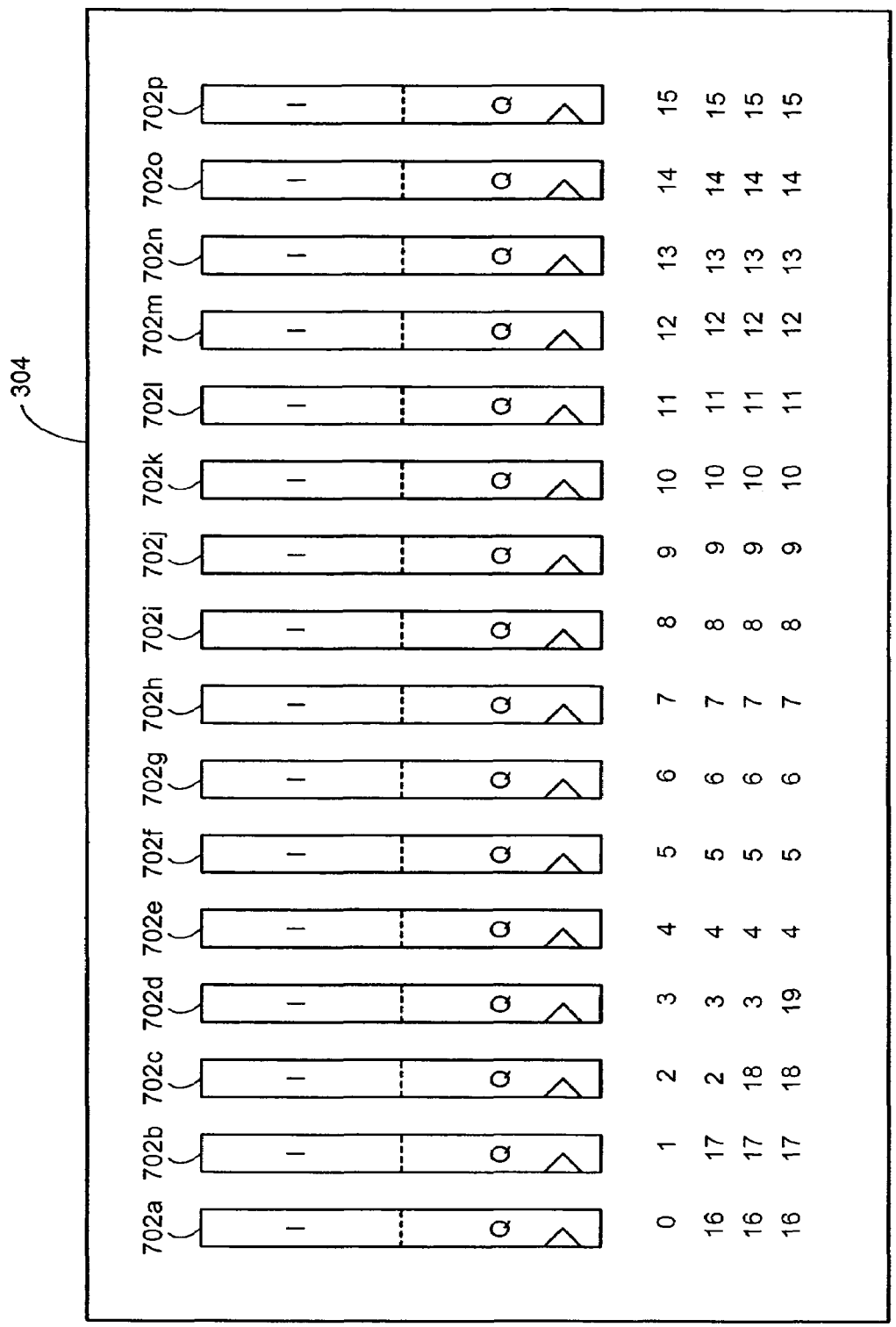
FIG. 7 illustrates an exemplary memory in accordance with an embodiment of the invention.

FIG. 7 illustrates an exemplary memory 304 in accordance with an embodiment of the invention. The memory 304 includes multiple registers 702a-702p. Each register 702 is divided into two halves: one half for storing In-Phase (I) data and another half for storing Quadrature (Q) data. Decimated samples from the decimation circuit 302 are sequentially written into the multiple registers 702 in a circular manner, one sample being stored in each register. Thus, when all the registers 702 have been initially written into, the next sample is written into the least recently written register and so forth. For example, if there are 16 registers and the samples are stored in numerical order starting with sample 0, then sample 16 is stored by overwriting sample 0, sample 17 is stored by overwriting sample 1, etc. as shown in FIG. 7. This way, the memory 304 contains the most recent samples from the decimation circuit 302. The number of registers shown in memory 304 of FIG. 7 is arbitrary and can be increased or decreased depending on system requirements.

In an exemplary embodiment, the memory 304 stores only samples from one antenna. When multiple antennas are providing samples (e.g., at a base station), multiple memories 304 should be implemented, one per antenna.

Figure 8:
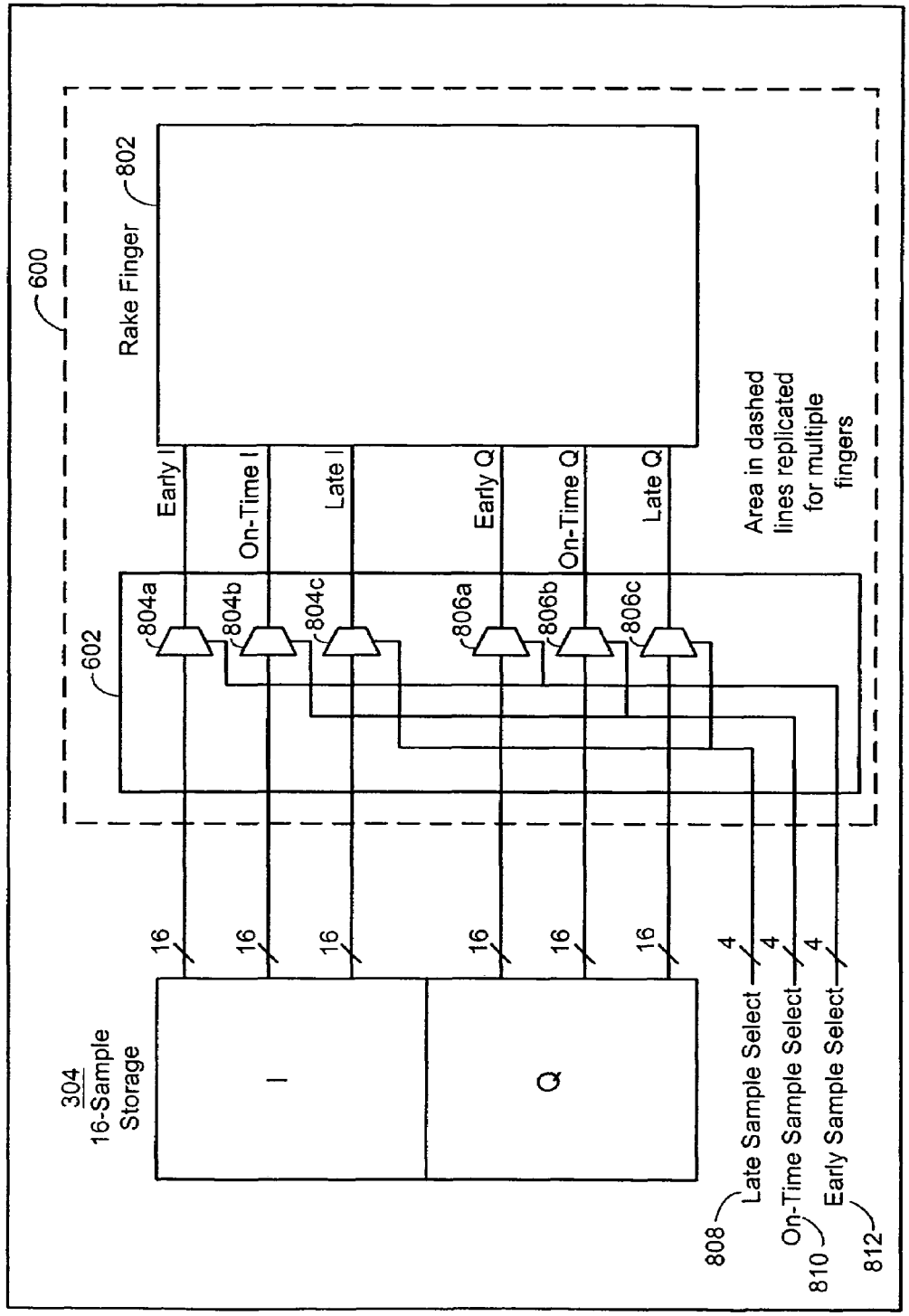
FIG. 8 illustrates an exemplary despreading circuit coupled to a memory in accordance with an embodiment of the invention.

FIG. 8 illustrates an exemplary despreading circuit 600 coupled to the memory 304 as shown in FIG. 7 above. For ease of explanation, the despreading circuit 600 includes only one rake finger 802. The rake finger 802 is configured to access the memory 304 substantially simultaneously with other rake fingers or virtual fingers (not shown) via the selector circuit 602. The rake finger 802 includes rake finger circuits known in the art for performing rake finger functions. The selector circuit 602 includes multiple multiplexers 804a-804c for providing three types of In-Phase data (i.e., Early, On-Time, and Late) and multiple multiplexers 806a-806c for providing three types of Quadrature data (i.e., Early, On-Time, and Late) to the rake finger 802, respectively. The selector circuit 602 also includes a Late sample select line 808, an On-Time sample select line 810, and an Early sample select line 812 for selecting various types of I or Q data. Advantageously, each multiplexer has an input from each register of memory 304 and control signals are applied to the multiplexer to allow selection of any of these inputs as the output from the multiplexer. As shown, memory 304 stores 16 samples and each select line 808-812 has four bits for identifying the sample to be selected by the multiplexer to which it is connected. In an exemplary embodiment, the sample select lines 808-812 are controlled by an external controller (not shown).

When more than one physical rake finger is implemented in the base band processor 204, the rake finger 802 and the select circuit 602 are replicated for each physical rake finger. Each physical rake finger requires its own set of select lines 808-812. In an exemplary embodiment, rather than using a different rake finger 802 to process the data of each different multipath, circuits in the rake finger 802 can be reused. In one embodiment, if three virtual fingers are implemented in a single physical rake finger 802, the select lines 808-812 will cycle through three sets of sample select operations, one per virtual finger, so that each virtual finger is given access to all the samples retrieved from the memory 304.

In an exemplary embodiment, the memory 304 is accessible substantially simultaneously by multiple physical or virtual rake fingers 802. For example, if samples are stored in the memory 304 at an 8× over sampling rate, during access by the rake finger 802, sixteen sets of I data (or words) are received by the I multiplexers 804 and sixteen sets of Q data (or words) are received by the Q multiplexers 806. That is, for the I multiplexers 804, the same sixteen sets of I data are available to the Early, On-Time, and Late multiplexers. Similarly, for the Q multiplexers 806, the same sixteen sets of Q data are available to the Early, On-Time, and Late multiplexers.

Figure 9:
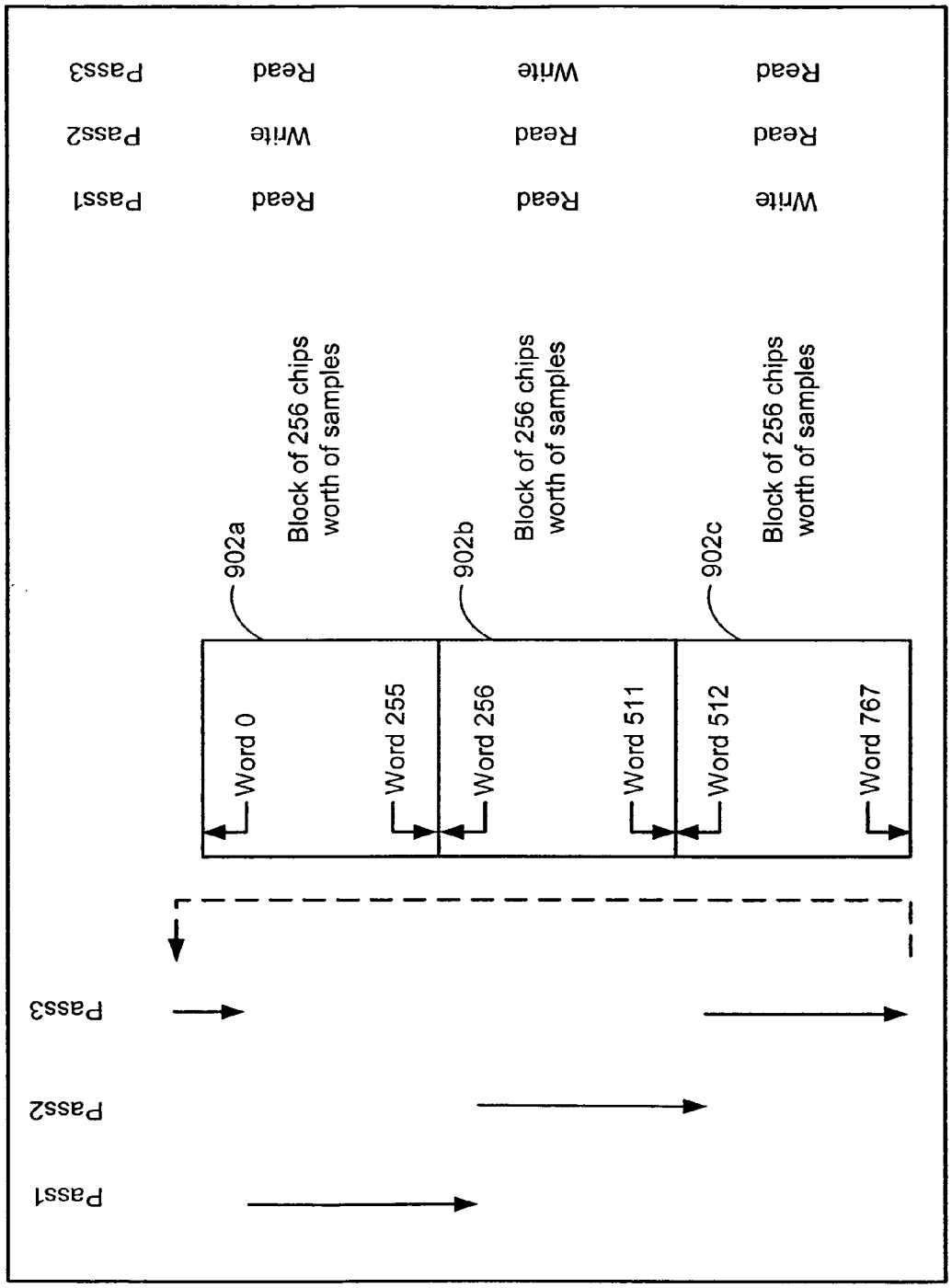
FIG. 9 illustrates another exemplary memory in accordance with an embodiment of the invention.

FIG. 9 illustrates another exemplary memory 304 in accordance with an embodiment of the invention. The memory 304 is divided into three blocks 902a-902c. Each block 902 can store up to 256 words or chips worth of samples. Generally, two types of data per sample (In-Phase and Quadrature) are stored per chip. In an exemplary embodiment, at a given pass, one block is in a Write mode and the remaining blocks are in a Read mode. Thus, as shown in FIG. 9, in Pass 1 data is being written to block 902c and read from blocks 902a and 902b and in Pass 2 data is being written to block 902a and read from blocks 902b and 902c. The blocks in Read mode allow multiple rake fingers with different offsets to read out data sequentially.

The size of the blocks 902 is determined based on several factors, including: the chipping rate of the processing system and the maximum (serviceable) round-trip distance between a mobile terminal and a base station. The chipping rate is dependent on applicable standards (e.g., IS-95, 3GPP, etc.). Generally, the higher the chipping rate, the bigger the memory block 902 should be. Further, the longer the maximum round-trip distance, the bigger the memory block 902 should be. For example, if the maximum round-trip distance is about 10 kilometers, each block in the memory 304 should be able to store about 256 chips. A person skilled in the art knows how to calculate the memory block size based on the maximum round-trip distance and the chipping rate.

Figure 10:
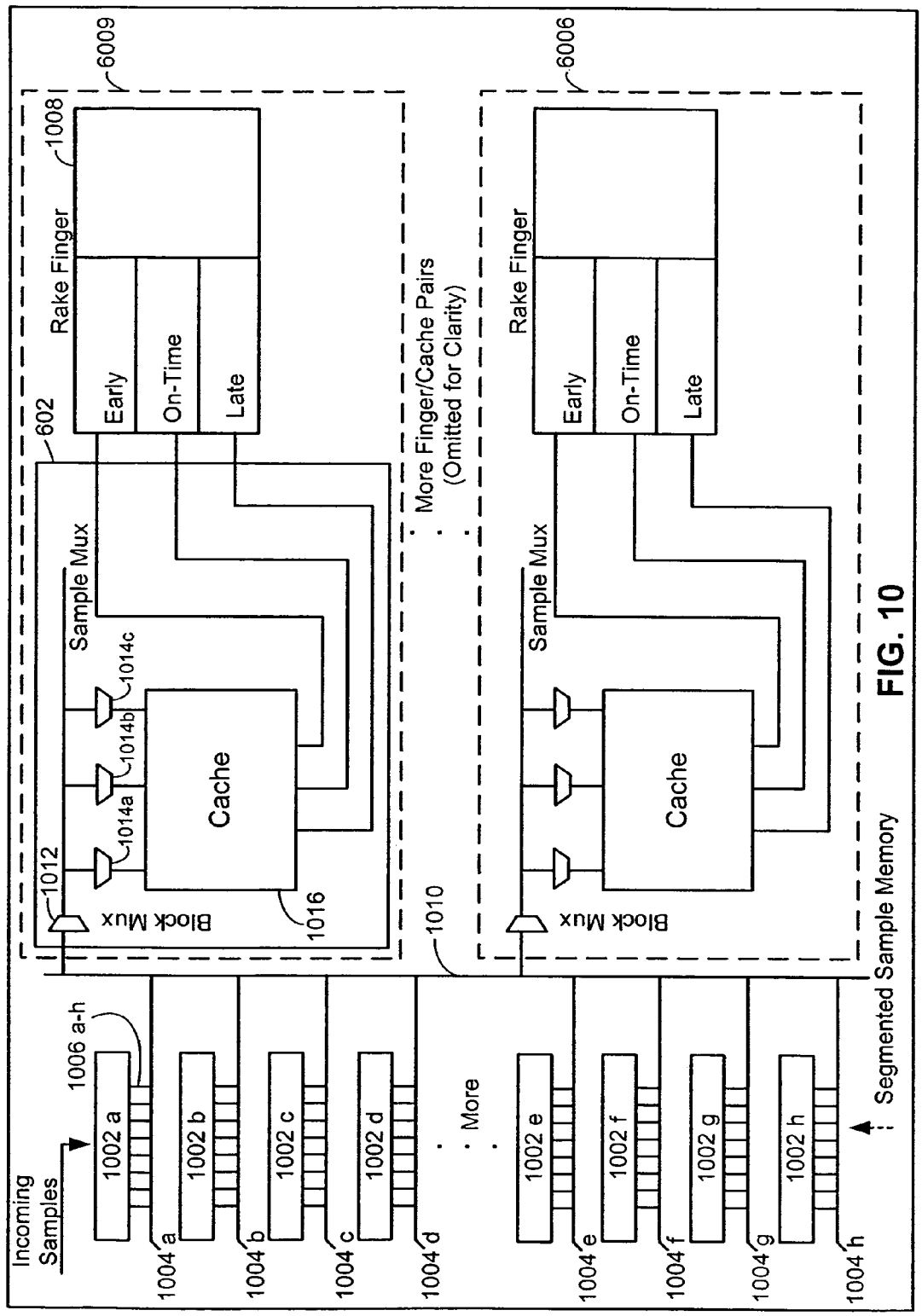
FIG. 10 illustrates another exemplary despreading circuit coupled to a memory in accordance with an embodiment of the invention.

FIG. 10 illustrates another exemplary despreading circuit 600 coupled to the memory 304 as shown in FIG. 9 above. In FIG. 10, each memory block 902 in the memory 304 is further divided into segments 1002a-1002h. In an exemplary embodiment, the size of the segments 1002 is dependent on area minimization. For example, for a memory block of 256 word (or chip) size, a 16 or 32 word segment 1002 is a good performance trade-off. A person skilled in the art knows how to calculate a performance area trade-off and determine an optimum size for the segments 1002 based on the memory block size. Each memory segment 1002 is coupled to a separate bussing element 1004a-1004h via multiple signal lines 1006a-1006h. In general, each signal line 1006 carries an I and Q data pair onto the bussing element 1004. Each bussing element 1004 sequentially reads out data from its respective segment 1002.

Multiple despreading circuits 600a-600b are connected to the memory segments 1002 via a bus 1010. Each despreading circuit 600 includes a selector circuit 602 and a rake finger 1008. The selector circuit 602 includes a block multiplexer 1012, three sample multiplxers 1014a-1014c, and a cache 1016. The rake finger 1008 includes hardware known in the art. The block multiplexer 1012 selects one of the bussing elements 1004 to read data from one of the segments 1002. The sample multiplexers 1014 selects the Early, On-time, and Late samples among the I and Q data pairs read from a segment 1002, which was selected by the block multiplexer 1012. The I and Q data pairs selected by the sample multiplexers 1014 are stored into the cache 1016 to be processed by the rake finger 1008. In an exemplary embodiment, the cache 1016 is a FIFO cache that begins storing samples when the first chip to be processed is presented to the FIFO. In an exemplary embodiment, each selector circuit 602 is coupled to an independent interpolation circuit (not shown) to interpolate samples retrieved from the memory 304.

Figure 11:
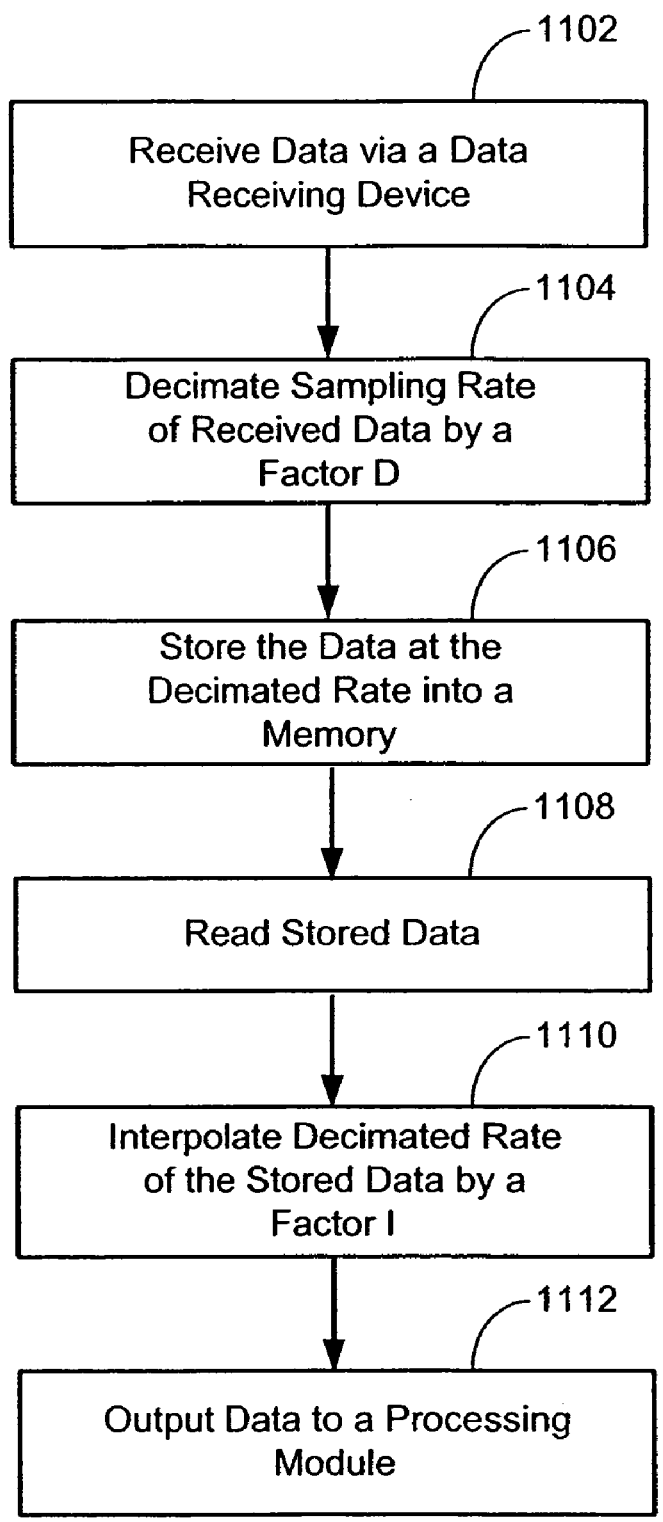
FIG. 11 illustrates an exemplary process in accordance with an embodiment of the invention.

FIG. 11 illustrates an exemplary process in accordance with an embodiment of the invention. At step 1102, data is received at an antenna and sampled at a sampling rate R. The sampling rate of the received data is decimated by a factor of D by the decimation circuit 302 (step 1104). Next, data is stored into the memory 304 at the decimated rate (step 1106). Stored data is read from the memory 304 as needed and provided to the interpolation circuit 306 (step 1108). In an exemplary embodiment, the memory 304 is read and controlled by a micro-processor (e.g., micro-processor 108) or a dedicated controller. The memory can be accessed by multiple physical and virtual rake fingers substantially simultaneously via a selector circuit. In one embodiment, the memory is a circular buffer comprised of multiple registers. In another embodiment, the memory is a single-port RAM.

The interpolation circuit 306 interpolates the rate of the data read from the memory 304 (step 1110) then outputs the data at an interpolated rate (e.g., a predetermined multiple of the chipping rate (i.e., 1×, 2×, 4×, 8×, etc.)) into the next processing module, such as the base band processor 204 (step 1112).

In an exemplary embodiment, the decimation and interpolation factors are hard-coded into the decimation-interpolation circuit 202. In another exemplary embodiment, the decimation and interpolation factors are dynamically re-programmable to accommodate various communication protocols depending on the surrounding infrastructure either by utilizing a scan chain (which is a technique known to one skilled in the art) or by accessing registers controlling the operation by the microprocessor, or by other means. Data is stored into the memory 304 at a minimum speed to reduce the required memory size. Later, data retrieved from the memory 304 is interpolated to an increased rate. As a result, memory space requirements at the memory 304 are small while efficiency during the next processing stages (such as at the base band processor 204) is not compromised.

Figure 12:
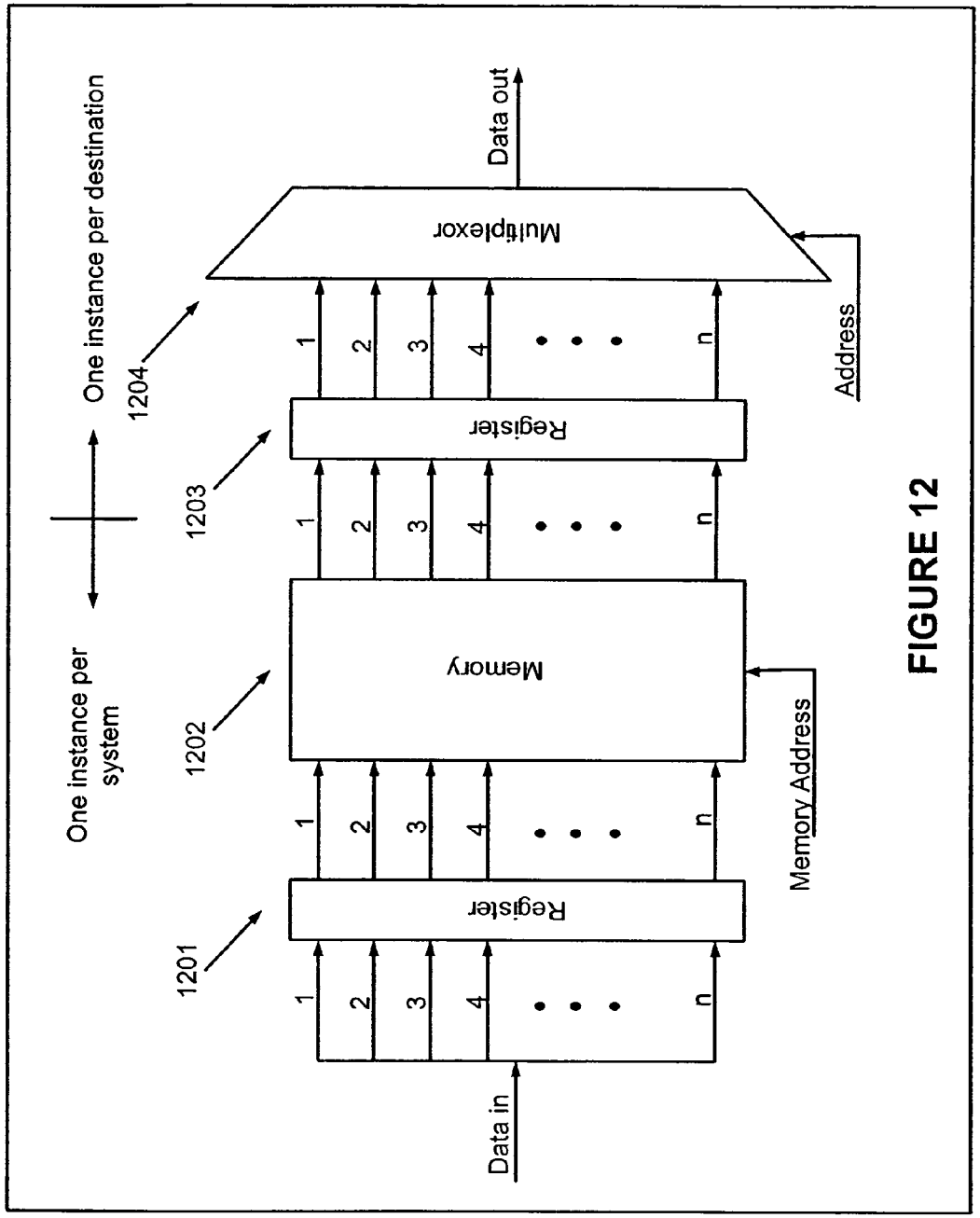
FIG. 12 illustrates an implementation of a single port memory that is functionally a multiport memory.

FIG. 12 illustrates the use of a wide RAM structure that behaves in a manner analogous to a multi-port RAM. The RAM structure comprises a register 1201, a memory 1202, a register 1203 and a multiplexer 1204. The output of multiplexer 1204 is provided to one rake finger.

Register 1201 is segmented into n segments, each being capable of being written independently and each storing one sample. If n is a power of 2 the operation is simpler. Successive samples are stored into successive segments in register 1201. When n samples have been assembled they are written into one memory location in memory 1202.

Each finger has its own register 1203 and multiplexer 1204.

Figure 13:
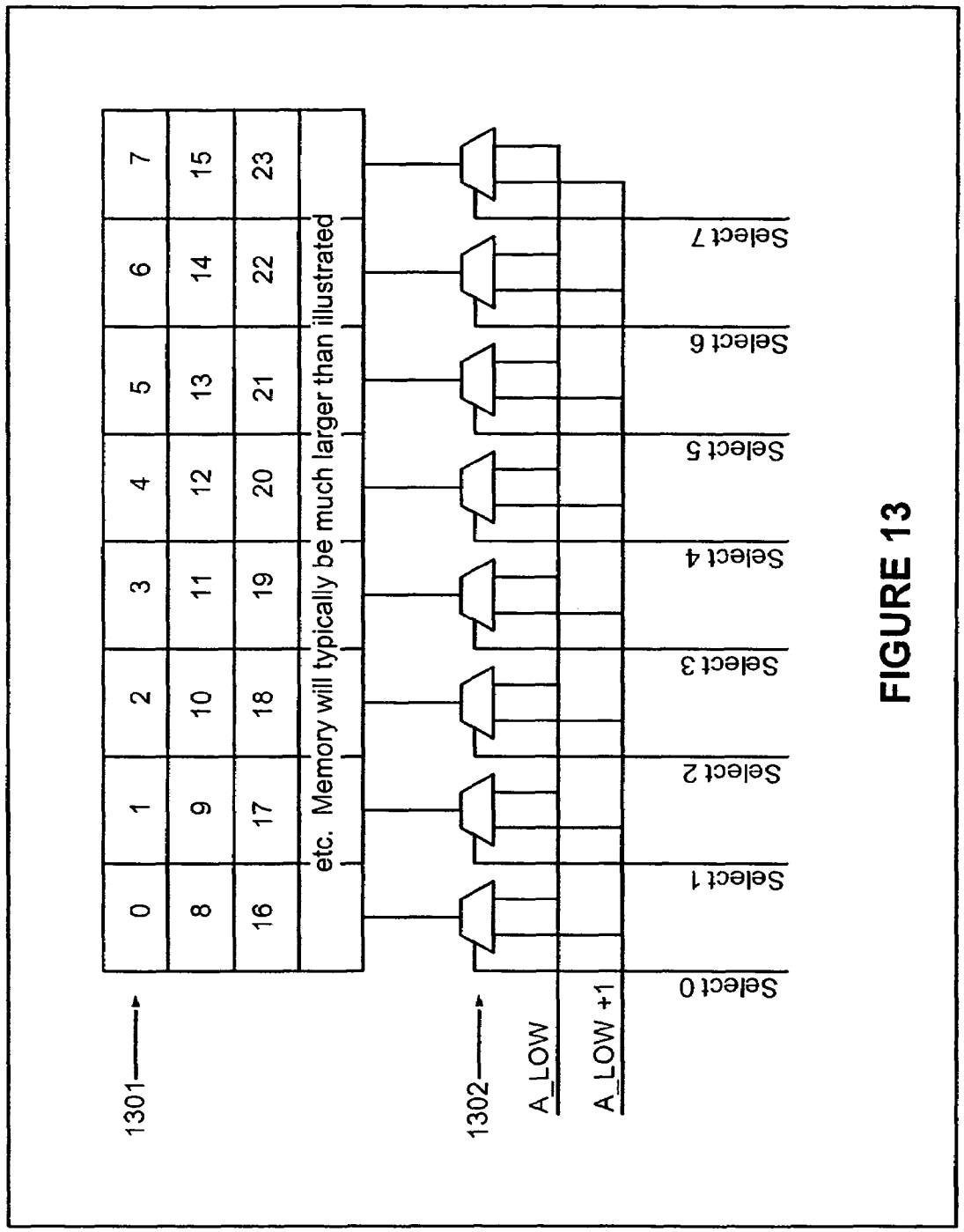
FIG. 13 illustrates how the memory in FIG. 12 can access a contiguous series of addresses starting at any address.

FIG. 13 illustrates more detail of memory 1202 and depicts how data can be read from memory 1202 on any address boundary. For purposes of illustration, it is assumed that 8 samples are stored at each memory address 1301, that the samples are numbered consecutively as shown and that it is desired to read out 8 consecutive samples starting at any sample address (and not necessarily at a memory address).

The memory is addressed by address circuitry that comprises a plurality of multiplexers 1302-0 through 1302-7, address lines A_LOW and A_LOW+1 and select lines 0 through 7. Each multiplexer selects an address from either A_LOW or A_LOW+1 depending on the value on the select line connected to the multiplexer. The number of multiplexers (and select lines) is equal to the number of samples stored at each address 1301 in memory.

The memory address on address line A_LOW is formed by dividing the sample address by the number of samples stored at each memory address. The memory address on address line A_LOW+1 is one more than the memory address on address line A_LOW. The remainder that results from the division of the sample address by the number of samples stored controls the value on each select line. If the remainder is equal to or less than the number of the select line, the signal supplied by the select line to the multiplexer is such that the memory address on line A_LOW is selected. If the remainder is greater than the number of the select line, the signal supplied by the select line to this multiplexer is such that the memory address on line A_LOW+1 is selected.

Thus, if it is desired to read out 8 samples starting with same address 5, Select5, Select6, and Select7 will steer the multiplexer 1302 to supply A_LOW and the remaining Selects will steer their multiplexers 1302 to supply A_LOW+1. The multiplexer 1204 will supply data in the order 5, 6, 7, 8, 9, 10, 11, 12.

In the apparatus of FIGS. 12 and 13 cycles are dedicated to a particular operation. A request-arbitration scheme will accomplish the same goals.

When a memory such as shown in FIGS. 9, 10 or 12 or similar the possibilities exist of finger reuse and multiple antenna support.

Memory 1202, if n samples wide, can support up to n−1 fingers if operated at chipping rate.

If the memory 1202 is operated at some higher frequency than the chipping rate, a multiple, plus possibly some overhead for context switching, then data from the same block of memory can be fed more than once to the same finger hardware thus providing finger reuse. A block of data, for example 256 chips, can be processed by a finger, then a second block (probably with different starting point) can be processed by the same finger hardware. As each finger is not processing a continuous data stream, cycles may be required for context switching, possibly including the initialization of interpolation filters.

If the memory 1202 is operated at some higher frequency than the chipping rate, a multiple, plus possibly some overhead for context switching, or if less than n−1 fingers are supplied, and the size of the memory is increased by a multiple A (new memory size=previous memory size×A), then data from A antennas can be supplied to the rake fingers. The memory block, with its addressable access is inherently a multiplexor.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

The invention claimed is:

1. A method for processing data in a spread spectrum system, comprising:
   decimating a data rate of received spread spectrum data by a decimation factor to a decimated rate;
   storing the received spread spectrum data into a memory at the decimated rate; wherein the memory is a single port RAM and is divided into memory blocks, such that during processing a first subset of memory blocks is in a read mode and a second subset of memory blocks is in a write mode;
   interpolating the decimated rate by an interpolation factor to an interpolated rate; and
   reading the received spread spectrum data from the memory at the interpolated rate.

2. The method of claim 1,
   wherein each of the memory blocks is divided into segments,
   the method further comprising reading out data stored in each segment sequentially onto a bussing element accessible by multiple rake fingers.

3. The method of claim 1, wherein the received spread spectrum data is read from the memory at the interpolated rate by selecting in-phase data and quadrature data.

4. A method for processing data, comprising:
   providing a plurality of rake fingers;
   providing a memory at the input to the plurality of rake fingers; and
   providing a selector circuit positioned between the memory and each of the plurality of ralce fingers; and
   accessing, by the plurality of rake fingers, the memory substantially simultaneously via a respective selector circuit, wherein the accessing comprises:
      selecting, by a first plurality of multiplexers, in-phase data from the memory;
      selecting, by a second plurality of multiplexers, quadrature data from the memory; and
      controlling, by a set of select lines, data being selected by the first plurality of multiplexers and the second plurality of multiplexers.

5. The method of claim 4, wherein the memory is a circular buffer comprising a plurality of registers.

6. The method of claim 4, wherein the memory is a single-port RAM.

7. A method for processing data, comprising:
storing data in a memory located at an input to a plurality of rake fingers; and
accessing the memory substantially simultaneously by the plurality of rake fingers,
wherein the memory is divided into memory blocks such that, during each processing cycle, a first subset of the memory blocks is in a read mode and a second subset of the memory blocks is in a write mode.

8. The method of claim 7,
wherein each of the memory blocks is divided into segments,
the method further comprising reading out the data stored in each segment sequentially.

9. A method for processing data in a spread spectrum system, comprising:
providing a decimation circuit having an associated decimation factor;
providing a memory, which is a single port RAM, coupled to the decimation circuit, wherein the memory is divided into memory blocks such that during processing a first subset of memory blocks is in a read mode and a second subset of memory blocks is in a write mode; and
providing an interpolation circuit coupled to the memory, the interpolation circuit having an associated interpolation factor;
decimating, by the decimation circuit, a data rate of received data by the decimation factor to a decimated rate;
storing the received data into the memory at the decimated rate; and
interpolating, by the interpolation circuit, the decimated rate by the interpolation factor to an interpolated rate; and
retrieving the received data from the memory at the interpolated rate.

10. A method for processing data in a spread spectrum system, comprising:
providing a memory coupled to a set of despreaders via a bus;
wherein each of the set of despreaders comprises:
a block multiplexer coupled to the bus;
a set of sample multiplexers coupled to the block multiplexer;
a cache coupled to the sample multiplexers; and
a rake finger coupled to the cache, and
accessing samples stored in the memory substantially simultaneously via the bus, by the set of despreaders.

11. The method of claim 10, wherein the memory is divided into blocks such that during a processing cycle by a despreader, a first subset of the blocks is in a read mode and a second subset of the blocks is in a write mode.

12. The method of claim 11,
wherein the blocks are divided into segments,
the method further comprising reading out sequentially, onto a bussing element coupled to the bus, samples stored in each of the segments.

13. The method of claim 12, further comprising selecting samples from one bussing element, by the block multiplexer in each of the despreaders.

14. The method of claim 13, wherein the selecting comprises the sample multiplexers in each of the despreaders selecting appropriate Early, On-Time, and Late samples among samples received from the block multiplexer to be stored into the cache.

* * * * *

UNITED STATES PATENT AND TRADEMARK OFFICE
CERTIFICATE OF CORRECTION

| | | |
|---|---|---|
| PATENT NO. | : 7,616,680 B2 | Page 1 of 1 |
| APPLICATION NO. | : 11/447228 | |
| DATED | : November 10, 2009 | |
| INVENTOR(S) | : Joel D. Medlock et al. | |

It is certified that error appears in the above-identified patent and that said Letters Patent is hereby corrected as shown below:

In the Title Page

Please insert in the Related U.S. Application Data section:

-- (63) Continuation of application No. 09/920,095, filed on July 31, 2001.

(60) Provisional application No. 60/222,027, filed on July 31, 2000; Provisional application No. 60/222,008, filed on July 31, 2000; Provisional application No. 60/222,025, filed on July 31, 2000; and Provisional application No. 60/222,029, filed on July 31, 2000. --

In the claims

At column 10, line 52, In Claim 4, delete "ralce" and insert -- rake --, therefor Signed and Sealed this Sixth Day of April, 2010

David J. Kappos
*Director of the United States Patent and Trademark Office*

UNITED STATES PATENT AND TRADEMARK OFFICE
CERTIFICATE OF CORRECTION

PATENT NO.       : 7,616,680 B2
APPLICATION NO.  : 11/447228
DATED            : November 10, 2009
INVENTOR(S)      : Medlock et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 572 days.

Signed and Sealed this

Nineteenth Day of October, 2010

David J. Kappos
*Director of the United States Patent and Trademark Office*